US007254776B2

(12) United States Patent
Ejima et al.

(10) Patent No.: US 7,254,776 B2
(45) Date of Patent: Aug. 7, 2007

(54) INFORMATION PROCESSING APPARATUS

(75) Inventors: Satoshi Ejima, Tokyo (JP); Akihiko Hamamura, Chiba (JP)

(73) Assignee: Nikon Corporation, Tokyo (JP)

( * ) Notice: Subject to any disclaimer, the term of this patent is extended or adjusted under 35 U.S.C. 154(b) by 801 days.

(21) Appl. No.: 09/938,601

(22) Filed: Aug. 27, 2001

(65) Prior Publication Data

US 2002/0054110 A1 May 9, 2002

Related U.S. Application Data

(63) Continuation of application No. 08/972,742, filed on Nov. 18, 1997.

(60) Provisional application No. 60/033,698, filed on Dec. 20, 1996.

(30) Foreign Application Priority Data

Dec. 6, 1996 (JP) .................................. 8-326545
Apr. 15, 1997 (JP) .................................. 9-096906

(51) Int. Cl.
*H04N 9/74* (2006.01)
*G06F 15/00* (2006.01)

(52) U.S. Cl. ...................................... 715/726; 382/236

(58) Field of Classification Search ................ 345/756, 345/676, 767, 802, 778, 763, 719–726, 790–796; 382/284, 264, 300, 307, 236, 238–239, 243; 715/745–747, 725–726, 541, 719, 731; 396/316, 396/318, 322, 332; 375/240

See application file for complete search history.

(56) References Cited

U.S. PATENT DOCUMENTS

| | | | | | |
|---|---|---|---|---|---|
| 4,835,532 | A | * | 5/1989 | Fant | 345/611 |
| 4,941,191 | A | * | 7/1990 | Miller et al. | 382/261 |
| 5,345,517 | A | * | 9/1994 | Katayama et al. | 382/299 |
| 5,453,844 | A | * | 9/1995 | George et al. | 382/264 |
| 5,592,220 | A | * | 1/1997 | Ishii et al. | 348/220.1 |
| 5,623,587 | A | * | 4/1997 | Bulman | 345/630 |
| 5,642,135 | A | * | 6/1997 | Noguchi et al. | 345/547 |
| 5,642,498 | A | * | 6/1997 | Kutner | 345/547 |
| 5,648,760 | A | | 7/1997 | Kumar | |
| 5,717,793 | A | * | 2/1998 | Ushida et al. | 382/298 |
| 5,754,242 | A | | 5/1998 | Ohkami | 348/441 |
| 5,832,136 | A | * | 11/1998 | Hirose | 382/275 |
| 5,838,318 | A | * | 11/1998 | Porter et al. | 715/790 |
| 5,874,960 | A | * | 2/1999 | Mairs et al. | 345/733 |
| 5,880,786 | A | * | 3/1999 | Oku et al. | 375/240.15 |
| 5,883,476 | A | * | 3/1999 | Noguchi et al. | 315/368.12 |
| 5,926,155 | A | * | 7/1999 | Arai et al. | 345/10 |
| 6,046,734 | A | * | 4/2000 | Noguchi et al. | 345/213 |
| 6,262,778 | B1 | * | 7/2001 | Nonweiler et al. | 348/586 |
| 6,310,657 | B1 | * | 10/2001 | Chauvel et al. | 348/569 |
| 2003/0051255 | A1 | * | 3/2003 | Bulman et al. | 725/135 |

* cited by examiner

*Primary Examiner*—Steven P. Sax
(74) *Attorney, Agent, or Firm*—Oliff & Berridge, PLC

(57) ABSTRACT

An information processing apparatus is provided that inputs and outputs images of different resolutions. When a resolution of a line drawing input via an interface is lower than the resolution of the monitor and the resolution of an image input via the interface is higher than the resolution of the monitor, the line drawing is provided to an interpolation circuit and the image is provided to a low-pass filter. The line-drawing is interpolated in the interpolation circuit and the image is pixel thinned by the low-pass filter. The line drawing and the image are displayed after being converted to the resolution of the monitor.

17 Claims, 10 Drawing Sheets

INFORMATION PROCESSING APPARATUS

RELATED PROVISIONAL APPLICATION

This is a Continuation of application Ser. No. 08/972,742 filed Nov. 18, 1997. The entire disclosure of the prior application(s) is hereby incorporated by reference herein in its entirety.

This nonprovisional application claims the benefit of U.S. Provisional Application No. 60/033,698, filed Dec. 20, 1996.

INCORPORATION BY REFERENCE

The disclosures of the following priority applications are herein incorporated by reference:

Japanese Application No. 8-326545, filed Dec. 6, 1996; and

Japanese Application No. 9-096906, filed Apr. 15, 1997.

BACKGROUND OF THE INVENTION

1. Field of Invention

The present invention relates to an information processing apparatus such as an information processing apparatus that can efficiently perform input and display of images of different resolutions.

2. Description of Related Art

In recent years, electronic cameras have come to be used in place of cameras using film such that images of objects are photographed using a CCD and are converted into digital data and stored in internal memory and removable memory cards. The photographed images can be reproduced and displayed on an LCD (or CRT screen) without undergoing development and printing as in conventional cameras. The photographed images can be transferred to a personal computer, displayed on the screen and stored on the hard disk of the personal computer.

Images of photographs and film can be input using a scanner and subsequently displayed on an LCD or CRT screen or can be read into a personal computer and displayed on the screen and stored on the hard disk of the personal computer.

Many pixels are required to represent landscapes and the like. For example, approximately one million pixels are required to photograph an ordinary "cabinet" sized photograph. On the other hand, not as many pixels are required to represent characters that are input into the same cabinet size area, for example, by a pen.

Consequently, there is a problem when inputting line drawings by pen along with inputting images and having the images and line drawings displayed superimposed at the same resolution. This becomes an inefficient system due to the different resolutions of the images and the line drawings.

For example, when line drawings of characters input by hand are to be superimposed on images read in by electronic cameras and scanners, wasteful memory space may be used to input the line drawings beyond the necessary resolution.

SUMMARY OF THE INVENTION

The present invention was made in consideration of such conditions and is intended to efficiently display images of different resolutions on the same apparatus at the specified resolution.

An information processing apparatus is provided that outputs a first image and a second image overlaid on the first image. The information processing apparatus may include a first output device (e.g., an image memory area) that outputs the first image and a second output device (e.g., a line drawing memory area) that outputs the second image overlaid on the first image. The first output device outputs the first image at a first resolution and the second output device outputs the second image at a second resolution different from the first resolution.

The image processing apparatus may further include a display device (e.g., a monitor) that displays the first image and the second image.

The smaller resolution of the first resolution and the second resolution may match the resolution of the display device.

Further, the larger resolution of the first resolution and the second resolution may match the resolution of the display device.

In at least one embodiment, the information processing apparatus may include a first image input device (e.g., a CCD) that inputs a first image, a first filter device (e.g., an optical low-pass filter) that eliminates the high spatial frequency component of the first image and a first memory device (e.g., the image memory area) that records the first image having the high spatial frequency component eliminated by the first filter device.

Additionally, the information processing apparatus may include a second image input device (e.g., a touch tablet and pen) that inputs a second image, a second filter device (e.g., a low-pass filter) that eliminates the high spatial frequency component of the second image and a second memory device (e.g., the line drawing memory area) that records the second image having the high spatial frequency component eliminated by the second filter device. An interpolation device (e.g., a CPU) may interpolate the second image recorded by the second memory device and a third filter device (e.g., a low-pass filter) may eliminate the high spatial frequency component of the first image output by the first memory device and the second image interpolated by the interpolation device. An output device (e.g., an LCD) may output a third image having superimposed the first image (having the high spatial frequency component eliminated by the third filter device) and the second image (having the high spatial frequency component eliminated by the third filter device).

In at least one embodiment, the information processing apparatus may include a first image input device (e.g., a CCD) that inputs a first image, a first filter device (e.g., an optical low-pass filter) that eliminates the high spatial frequency component of the first image and a first memory device (e.g., an image memory area) that records the first image having the high spatial frequency component eliminated by the first filter device. The information processing apparatus may also include a second image input device (e.g., a touch tablet and pen) that inputs a second image, a second filter device (e.g., a low-pass filter) that eliminates the high spatial frequency component of the second image and a second memory device (e.g., a line drawing memory area) that records the second image having the high spatial frequency component eliminated by the second filter device. An interpolation device (e.g., an interpolation circuit) may interpolate the second image recorded by the second memory device. An output device (e.g., a frame memory) may output a third image having superimposed the first image recorded by the first memory device and the second image interpolated by the interpolation device.

In at least one embodiment, the information processing apparatus may include a first image input device (e.g., a CCD) that inputs a first image, a first filter device (e.g., an optical low-pass filter) that eliminates the high spatial frequency component of the first image and a first memory device (e.g., an image memory area) that records the first image having the high spatial frequency component eliminated by the first filter device. A second image input device (e.g., the touch tablet and pen) may input a second image and a second filter device (e.g., a low-pass filter) may eliminate the high spatial frequency component of the second image. A second memory device (e.g., a line drawing memory) may record the second image having the high spatial frequency component eliminated by the second filter device. An interpolation device (e.g., the interpolation circuit) may interpolate the second image recorded by the second memory device and a pixel thinning device (e.g., a low-pass filter) may perform pixel thinning on the first image recorded by the first memory device. An output device (e.g., a frame memory) may output a third image having superimposed the first image having undergone processing by the pixel thinning device and the interpolated second image recorded by the second memory device.

A display device (e.g., a monitor) may display the third image output by the output device.

The first image may be a photographic image and the second image may be a line drawing.

The capacity of the first memory device may be greater than the capacity of the second memory device.

Further, the resolution of the first image may be higher than the resolution of the second image.

The first output device may output a first image and the second output device may output a second image overlaid on the first image. The first output device outputs the first image at a first resolution and the second output device outputs the second image at a second resolution different from the first resolution.

The first image input device may input a first image. The first filter device may eliminate the high spatial frequency component of the first image. Additionally, the first memory device may record the first image having the high spatial frequency component eliminated by the first filter device. The second image input device may input a second image and the second filter device may eliminate the high spatial frequency component of the second image. The second memory device may record the second image having the high spatial frequency component eliminated by the second filter device. The interpolation device may interpolate the second image recorded by the second memory device and the third filter device may eliminate the high spatial frequency component of the first image output by the first memory device and the second image interpolated by the interpolation device. The output device may output a third image having superimposed the first image having the high spatial frequency component eliminated by the third filter device and the second image having the high spatial frequency component eliminated by the third filter device.

The first image input device may input a first image and the first filter device may eliminate the high spatial frequency component of the first image. The first memory device may record the first image having the high spatial frequency component eliminated by the first filter device and the second image input device may input a second image. The second filter device may eliminate the high spatial frequency component of the second image and the second memory device may record the second image having the high spatial frequency component eliminated by the second filter device. The interpolation device may interpolate the second image recorded by the second memory device. Additionally, the output device may output a third image having superimposed the first image recorded by the first memory device and the second image interpolated by the interpolation device.

Still further, the first image input device may input a first image and the first filter device may eliminate the high spatial frequency component of the first image. The first memory device may record the first image having the high spatial frequency component eliminated by the first filter device. The second image input device may input a second image and the second filter device may eliminate the high spatial frequency component of the second image. The second memory device may record the second image having the high spatial frequency component eliminated by the second filter device. The interpolation device may interpolate the second image recorded by the second memory device. The pixel thinning device may perform pixel thinning on the first image recorded by the first memory device and the output device may output a third image having superimposed the first image having undergone processing by the pixel thinning device and the interpolated second image recorded by the second memory device.

A program may be recorded on a recording medium used in an information processing apparatus that outputs a first image and a second image overlaid on the first image. The program controls the apparatus so that the first image is output in a first resolution and the second image is output in a second resolution different from the first resolution.

Other objects, advantages and salient features of the invention will become apparent from the following detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

Figure 1:
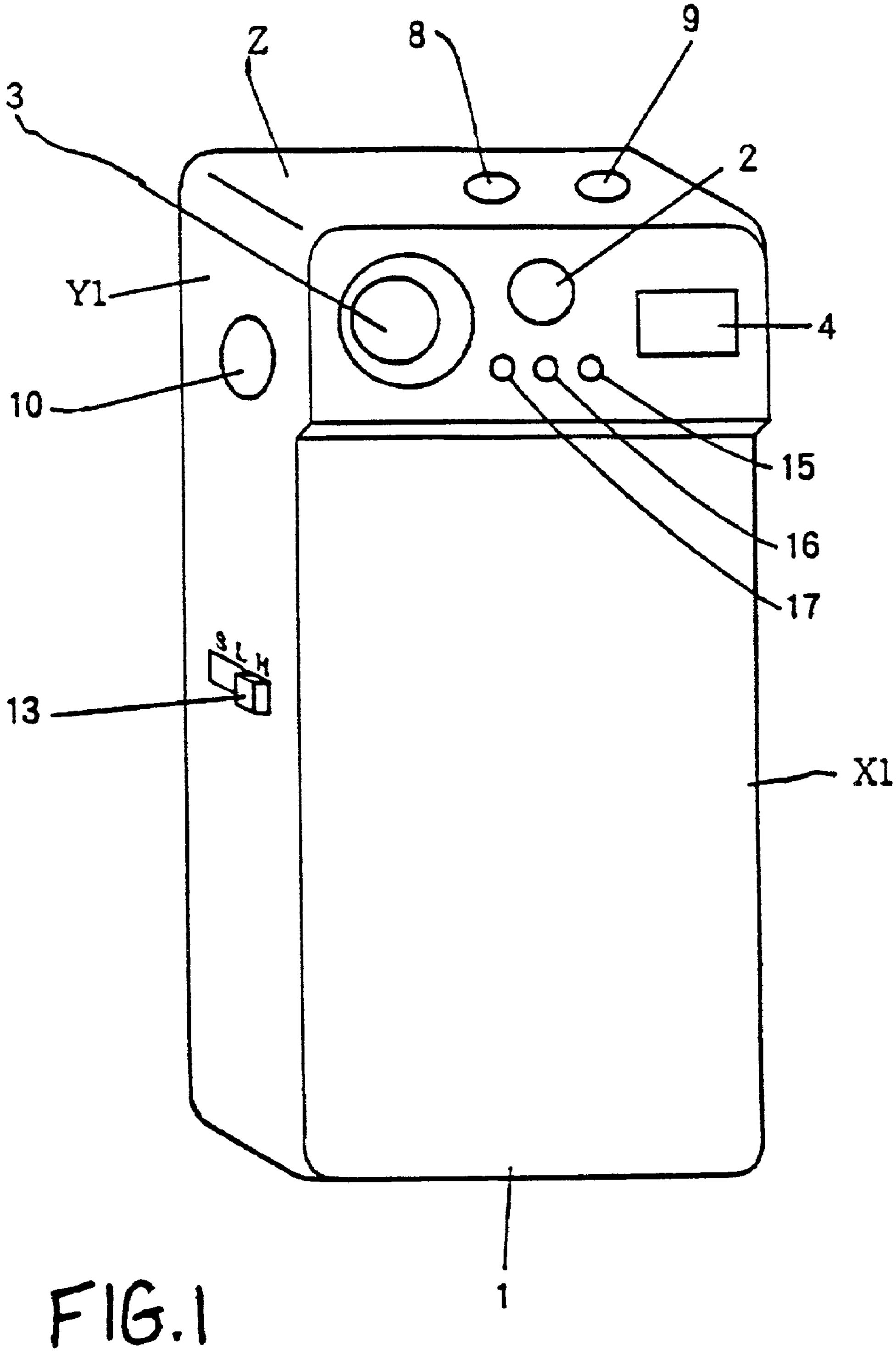
FIG. 1 is a front perspective drawing of one preferred embodiment of the electronic camera in accordance with the present invention.
Figure 2:
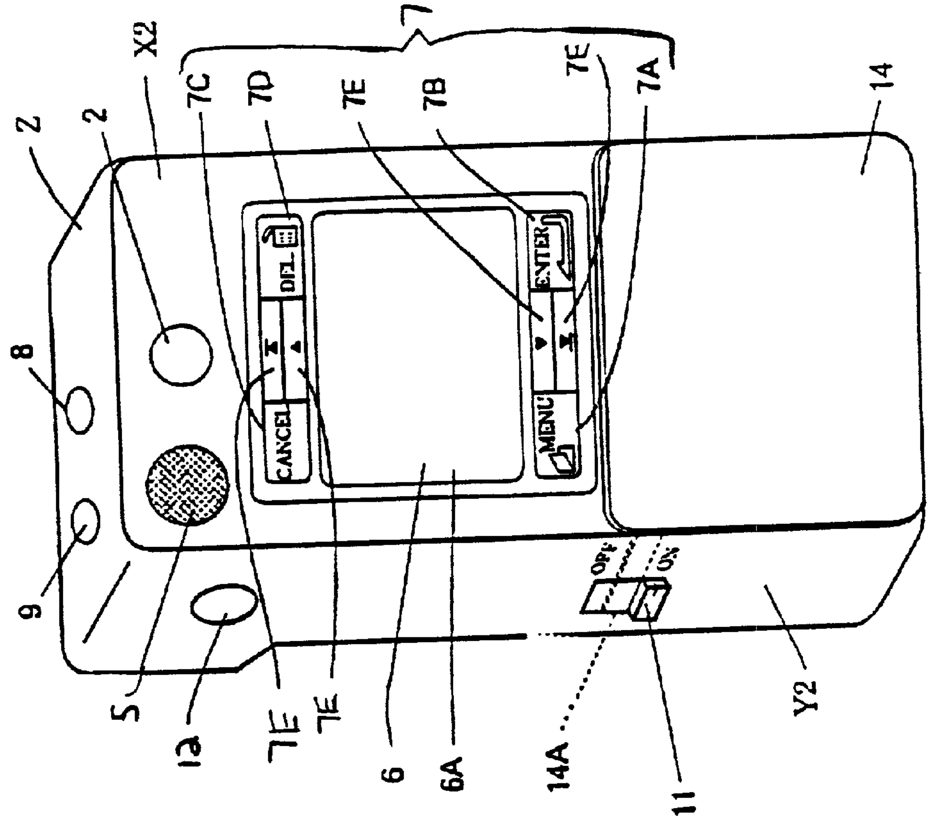
FIG. 2 is a rear perspective drawing of the electronic camera having the LCD cover opened.

FIGS. 1 and 2 are perspective drawings showing the structure of one preferred embodiment of the electronic camera in accordance with the present invention. In the electronic camera of the preferred embodiment, when photographing an object, face X1 is oriented toward the object and face X2 is oriented toward the user. A viewfinder 2 is provided on face X1 to confirm the photographic range of the object. A photographic lens 3 that takes in the light image of the object and a flash component (strobe) 4 that flashes light to illuminate the object are also provided on face X1.

Furthermore, a red-eye reduction (RER) LED 15 is provided on face X1 that reduces red-eye by emitting light before the strobe 4 flashes when performing photography. A photometry device 16 performs photometry when action of the CCD 20 (FIG. 4) is halted and a colorimetry element 17 performs colorimetry when the CCD 20 is halted.

Meanwhile, viewfinder 2 and speaker 5 that outputs sound corresponding to sound data recorded on a memory card are provided on the upper end of face X2 opposite face X1. LCD 6 and operating keys 7 are formed vertically below the viewfinder 2, photographic lens 3, flash component 4 and speaker 5. A touch tablet 6A is provided on the surface of the LCD 6 in which the positions indicated by contact operations of a pen-type pointing device are input as information.

The touch tablet 6A may be made of a transparent material such as glass, resin, or the like. The user may observe the images displayed to the LCD 6 formed beneath the touch tablet 6A.

The operating keys 7 are operated when reproducing and displaying recorded data to the LCD 6. The operating keys 7 sense operations input by the user and provide signals to the CPU 39.

The menu key 7A is operated when displaying menu screens to the LCD 6. The execute (run) key 7B is operated when reproducing the recorded information selected by the user.

The cancel key 7C is operated when aborting reproduction processing of the recorded data. The delete key 7D is operated when deleting recorded data. The scroll key 7E is operated when scrolling the screens up and down when lists of the recorded data are displayed on the LCD 6.

Figure 3:
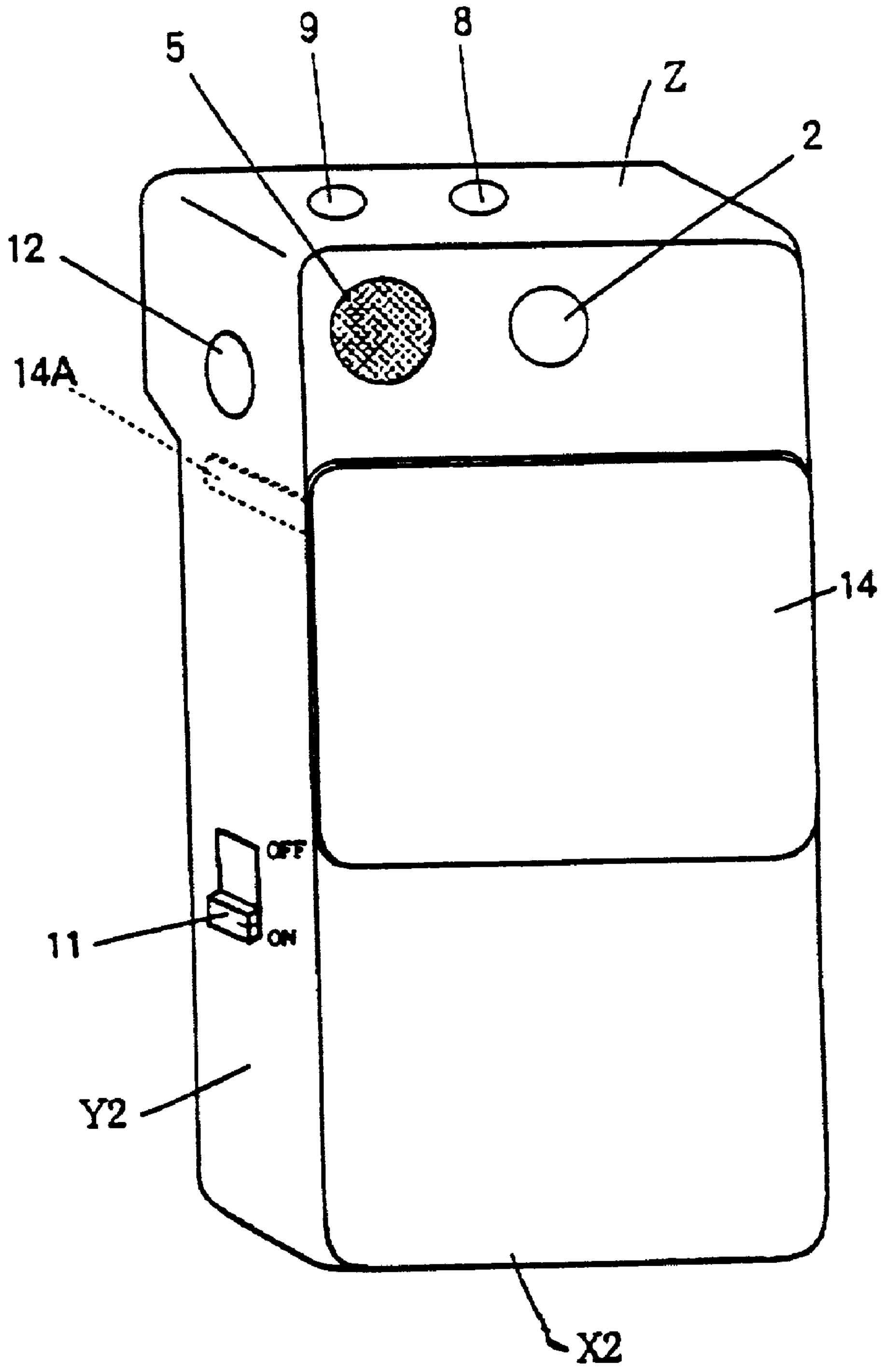
FIG. 3 is a rear perspective drawing of the electronic camera having the LCD cover closed.

Freely slideable LCD cover 14 is also provided to protect the LCD 6 when not in use. The LCD cover 14 may be moved vertically upward (FIG. 3) to cover the LCD 6 and the touch tablet 6A. When the LCD cover 14 is moved vertically downward to expose the LCD 6 and touch tablet 6A, a power switch 11 (on face Y2) is switched ON by an arm 14A on the LCD cover 14.

Microphone 8 is provided on face Z on top of the electronic camera 1 to collect sound while an earphone jack 9 is provided for connecting to an earphone.

Face Y1 includes a release switch 10 operated when photographing objects and a continuous mode switch 13 operated when switching the continuous mode during photography. The release switch 10 and continuous mode switch 13 are vertically below the viewfinder 2, photographic lens 3 and flash component 4 provided on the upper end of face X1.

Face Y2 (right face opposite face Y1) includes a sound recording switch 12 operated when recording sounds and a power switch 11 that switches the power supply on and off. The sound recording switch 12 and power switch 11 are vertically below the viewfinder 2, photographic lens 3 and flash component 4 provided on the upper end of face X1. The sound recording switch 12 may be formed at the same height as the release switch 10 on face Y1 and formed such that there is no feeling of incongruity when held by either the left or right hand.

Alternatively, different heights of the sound recording switch 12 and the release switch 10 can be provided such that one switch is not accidentally pressed when pressing a switch on the other side.

The continuous mode switch 13 may be used to photograph the object in only one frame or to photograph it in a fixed plurality of frames when the user photographs the object by pressing the release switch 10. For example, when the continuous mode switch 13 is switched to the position "S" (i.e., switched to S mode), only one frame of photography is performed when the release switch 10 is pressed.

When the continuous mode switch 13 is switched to the position "L" (i.e., switched to L mode), photography of 8 frames per second is performed during the period when the release switch 10 is pressed (i.e., low-speed continuous mode photography is performed).

Furthermore, when the continuous mode switch 13 is switched to the position "H" (i.e., switched to H mode), photography of 30 frames per second is performed during the period when the release switch 10 is pressed (i.e., high-speed continuous mode photography is performed).

Figure 4:
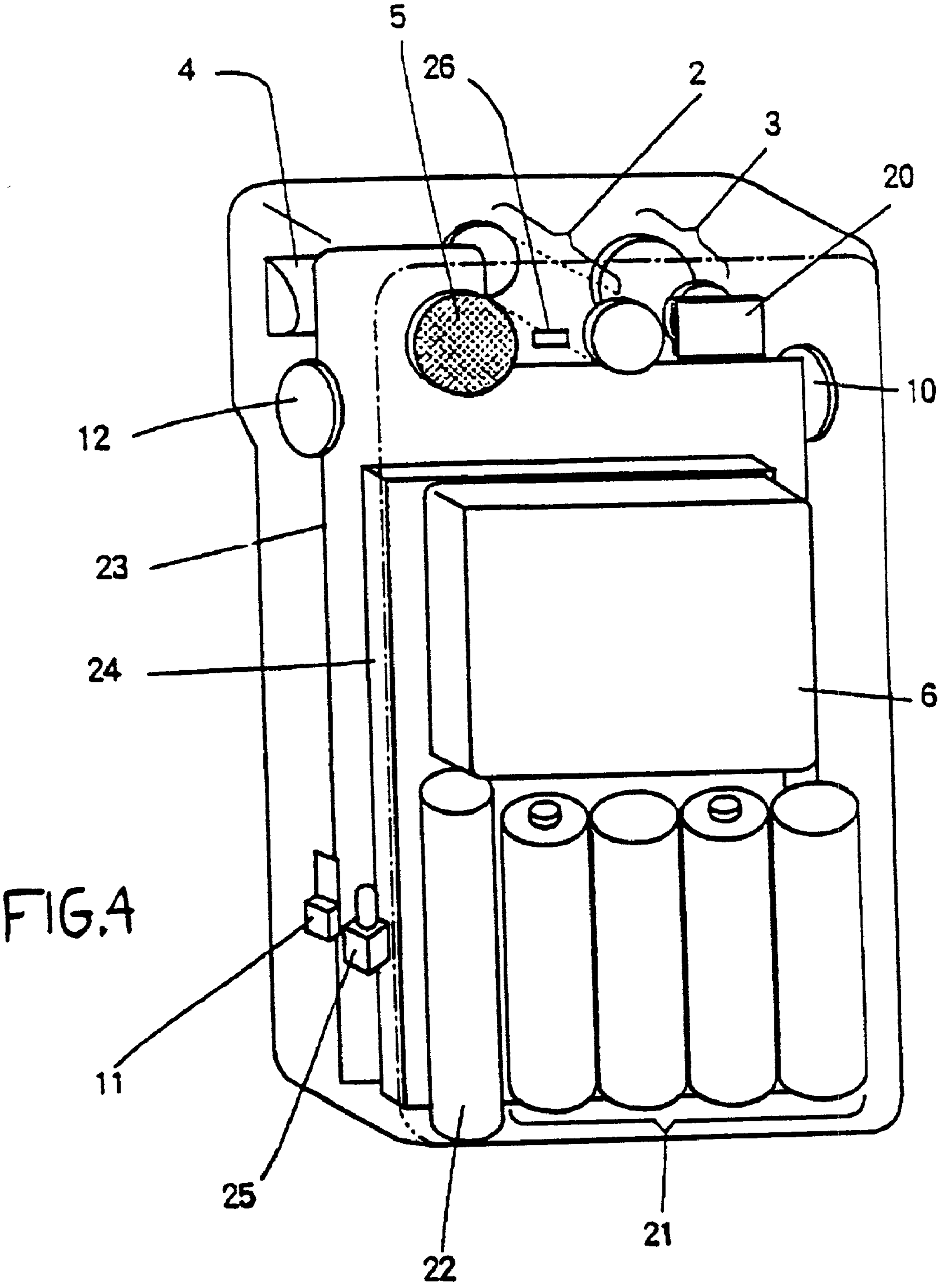
FIG. 4 is a drawing showing an internal structure of the electronic camera.

The internal structure of the electronic camera 1 will now be explained. FIG. 4 is a perspective drawing showing examples of the internal structure of the electronic camera shown in FIGS. 1 and 2. A CCD 20 is provided behind (on face X2) the photographic lens 3 to photoelectrically convert the light images of the objects formed via the photographic lens 3 into electrical (image) signals.

An in-viewfinder display 26 is placed inside the visual field of the viewfinder 2 to display the setting status of various functions for the user viewing the object through the viewfinder 2.

Four cylindrical batteries (size AA dry cells) 21 are arranged vertically below the LCD 6. The electric power accumulated in these batteries 21 is supplied to each component. Also, a condenser 22 that accumulates the load required when the flash component 4 flashes light is located alongside the batteries 21.

Various control circuits are formed on a circuit board 23 that control each component of the electronic camera 1. A removable memory card 24 is provided between the circuit board 23 and the LCD 6 and batteries 21. Various types of information input into this electronic camera 1 are recorded variously in predefined areas of the memory card 24.

Figure 5A:
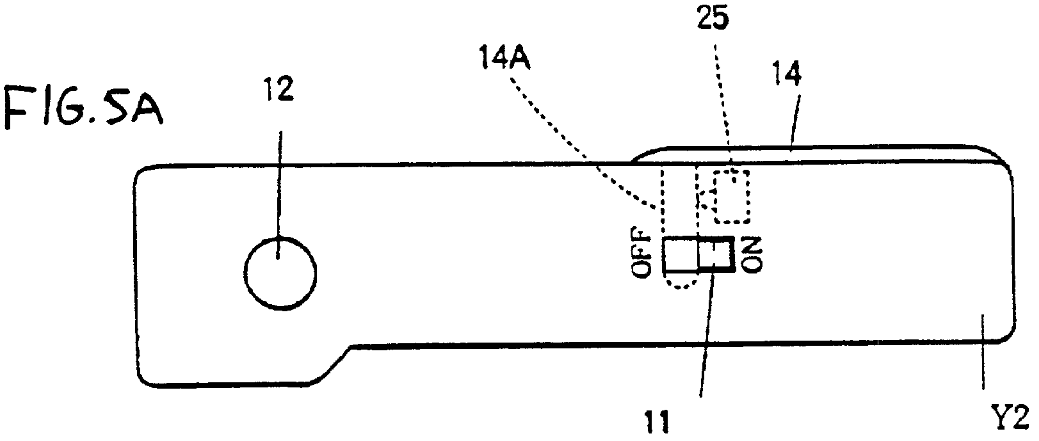
FIGS. 5A-5C are side views showing an LCD switch and LCD cover in different positions.

An LCD switch 25 adjacent to the power switch 11 is placed in the on state only while its plunger is pressed. As shown in FIG. 5A, when the LCD cover 14 is moved vertically downward, the LCD switch 25 is switched on along with the power switch 11 by the arm 14A of the LCD cover 14.

Figure 5B:
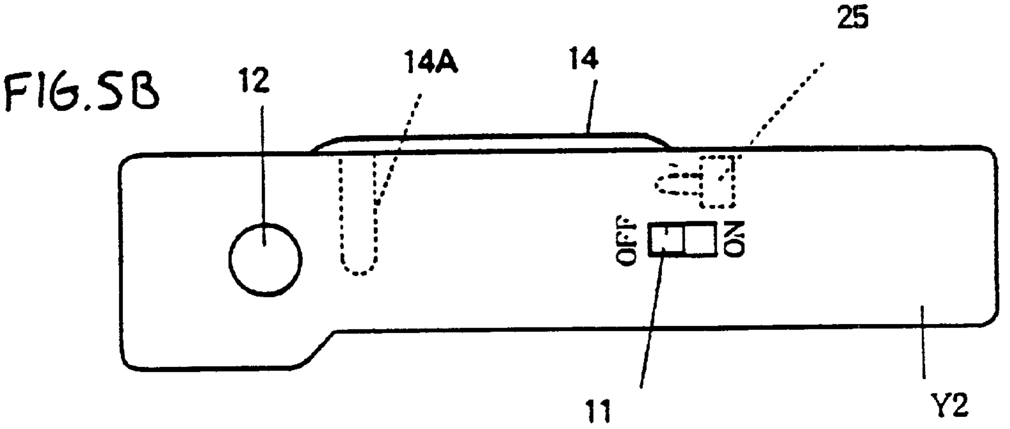
Figure 5C:
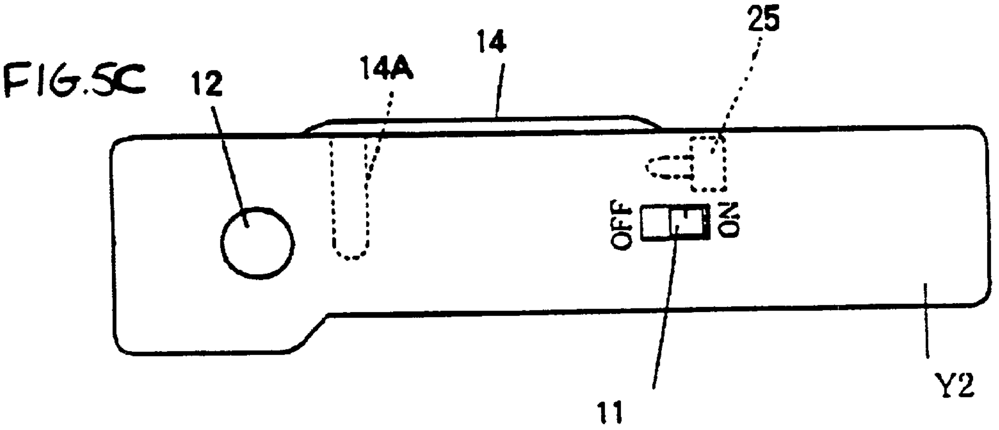
Figure 6:
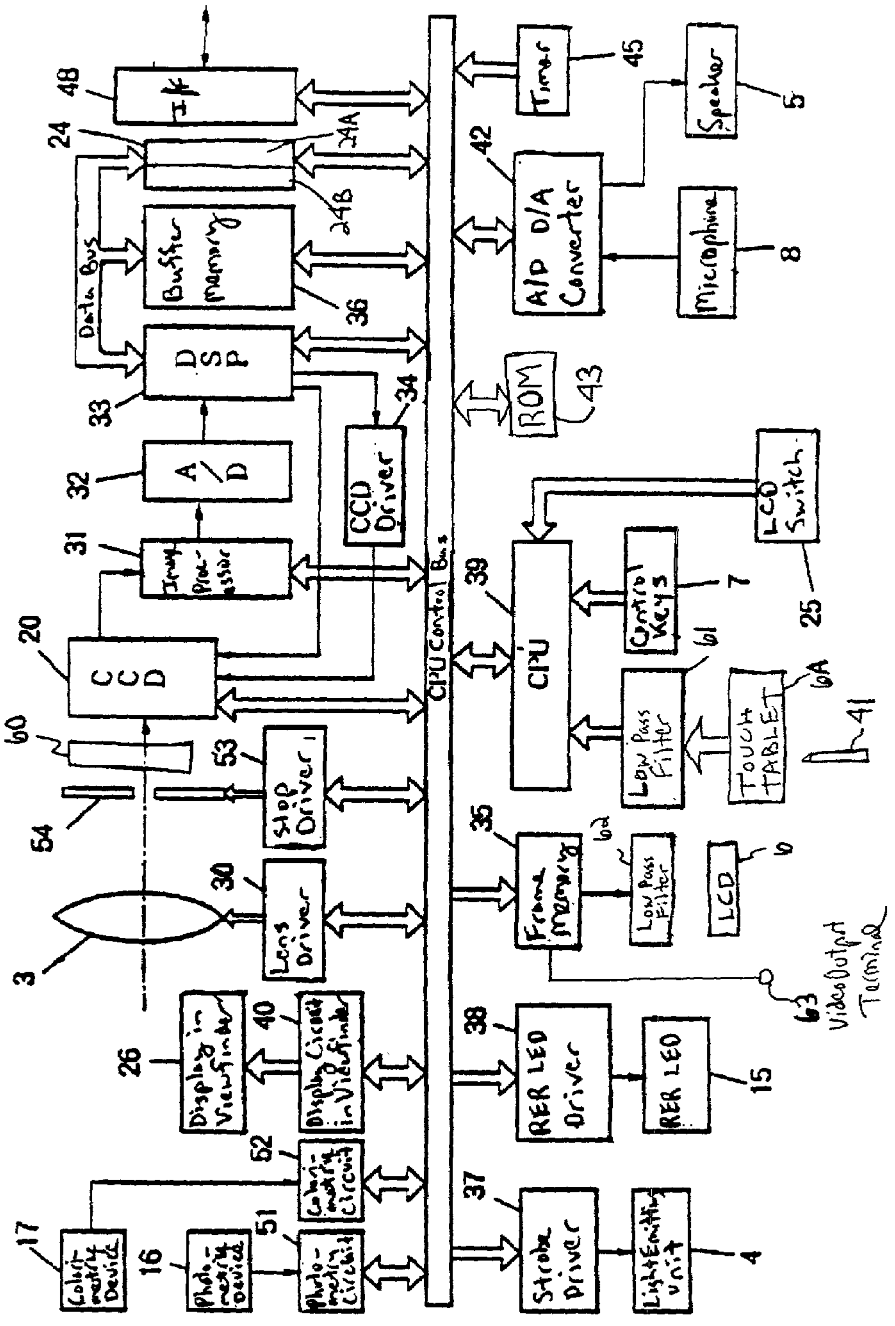
FIG. 6 is a block drawing showing the internal electrical structure of the electronic camera.

When the LCD cover 14 is moved vertically upward, the power switch 11 can be operated independently of the LCD switch 25 by the user. For example, when the LCD cover 14 is closed and the electronic camera 1 is not used, as shown in FIG. 5B, the power switch 11 and the LCD switch 25 are in the off state. In this state, when the user switches the power switch 11 to the on state as shown in FIG. 5C, the power switch 11 assumes the on state, but the LCD switch 25 remains in the off state. On the other hand, as shown in FIG. 5B, when the power switch 11 and the LCD switch 25 are in the off state, and when the LCD cover 14 is opened, as shown in FIG. 5A, the power switch 11 and the LCD switch 25 assume the on state. After that, if the LCD cover 14 is closed, only the LCD switch 25 assumes the off state as shown in FIG. 5C.

In a preferred embodiment, the memory card 24 is removable, and memory may be provided on the circuit board 23 such that various types of information can be recorded in that memory. The various types of information recorded in memory (memory card 24) may be output to a personal computer via an interface (not shown).

The internal electrical structure of the information input apparatus of a preferred embodiment will now be explained with reference to FIG. 4. A CCD 20 having multiple pixels photoelectrically converts the light images formed on each pixel into image signals (electrical signals). An optical low-pass filter 60 is provided between the stop 54 and the CCD 20 to eliminate the designated spatial frequency component of the light introduced from the lens 3. A digital signal processor (hereafter DSP) 33 provides CCD horizontal drive pulses to the CCD 20 and at the same time controls the CCD drive circuit 34 so that the CCD drive circuit (driver) 34 provides CCD vertical drive pulses to the CCD 20.

An image processor 31 is controlled by the CPU 39 to sample the image signals photoelectrically converted by the CCD 20 in a predetermined timing and amplify the sampled signals to predefined levels. An analog/digital conversion circuit (hereafter A/D conversion circuit) 32 digitizes the image signals sampled by the image processor 31 and provides the digital signals to the DSP 33.

The DSP 33 controls the data bus connected to the buffer memory 36 and memory card 24, and after temporarily storing the image data provided to the DSP 33 from the A/D conversion circuit 32 in the buffer memory 36, it reads out the image data stored in the buffer memory 36 and records it in the memory card 24. The memory card 24 includes an image memory area 24A and a line drawing memory area 24B. The image data is recorded in the image memory area 24A and the line drawing data is recorded in the line drawing memory area 24B.

Also, the DSP 33 in addition to having the image data provided from the A/D conversion circuit 32 stored in the frame memory 35, provided to the LCD 6 via a low-pass filter 62, and displayed to the LCD 6, reads out the photographic image data from the memory card 24, and after expanding (decompressing) the photographic image data, stores expanded image data in the frame memory 35, provides the data to the LCD 6 via the low-pass filter 62, and has the corresponding images displayed on the LCD 6. The low-pass filter 62 eliminates the high spatial frequency component of the image data provided by the frame memory 35, and provides it to the LCD 6.

When the electronic camera 1 is started, the DSP 33 repeatedly activates the CCD 20 while adjusting the exposure time (exposure value) until the exposure level of the CCD 20 reaches the proper level. At this time, the DSP 33 may first activate the photometry circuit 51 and then calculate the initial value of the exposure time of the CCD 20 in response to the photoreceptive level detected by the photometry device 16. By doing this, adjustment of the exposure time of the CCD 20 can be shortened.

The DSP 33 performs timing management of the data input/output during recording to the memory card 24 and storage to the buffer memory 36 of the expanded image data.

The buffer memory 36 is used for accommodating the difference between the speed of data input/output of the memory card 24 and the processing speed in the CPU 39 and the DSP 33.

The microphone 8 inputs sound information, which is provided to the A/D and D/A conversion circuit 42.

The A/D and D/A conversion circuit 42 converts the analog signals corresponding to the sound detected by the microphone 8 into digital signals and then provides those digital signals to the CPU 39 and also converts the digital signals provided from the CPU 39 into analog signals and outputs the analog sound signals to the speaker 5.

The photometry device 16 measures luminosity of the object and the surroundings, and outputs those measurement results to the photometry circuit 51. The photometry circuit 51 applies specified processing to the analog signals (i.e., the photometry results provided by the photometry device 16) and then converts the processed analog signals to digital signals, and then outputs those digital signals to the CPU 39.

The colorimetry device 17 measures the color temperature of the object and the surroundings, and outputs the measurement results to the colorimetry circuit 52. The colorimetry circuit 52 applies specified processing to the analog signals (i.e., the colorimetry results provided by the colorimetry device 17) and then converts the processed analog signals to digital signals and outputs those digital signals to the CPU 39.

A timer 45 with a built-in clock circuit outputs the data corresponding to the current time (date and time) to the CPU 39.

A stop drive circuit 53 sets the aperture diameter of the stop 54 to a specified value. The stop 54 is positioned between the photographic lens 3 and the CCD 20 to modify the aperture of the light entering the CCD 20 through the photographic lens 3.

The CPU 39 stops operations of the photometry circuit 51 and the colorimetry circuit 52 when the LCD cover 14 is open according to signals from the LCD switch 25. The CPU 39 activates the photometry circuit 51 and the colorimetry circuit 52 while halting the action of the CCD 20 (e.g., the action of the electronic shutter) until the release switch 10 reaches the half-pressed state when the LCD cover 14 is closed.

The CPU 39 controls the photometry circuit 51 and the colorimetry circuit 52 when action of the CCD 20 is halted and receives the photometry results of the photometry device 16 and the colorimetry results of the colorimetry device 17.

The CPU 39 refers to a specified table, calculates the white balance corresponding to the color temperature provided by the colorimetry circuit, and provides the white balance adjusted value to the image processor 31.

When the LCD cover 14 is closed, operation of the CCD 20 is halted because the LCD 6 is not used as an electronic viewfinder. Halting operation of the CCD 20 conserves electric power of the batteries 21 because the CCD 20 consumes a large amount of electric power.

Also, when the LCD cover 14 is closed, the CPU 39 controls the image processor 31 so as not to execute processing until the release switch 10 is operated (i.e., until the release switch 10 becomes the half-depressed state).

When the LCD cover 14 is closed, the CPU 39 controls the stop drive circuit 53 so as not to change the aperture diameter of the stop 54 until the release switch 10 is operated (i.e., until the release switch 10 becomes the half-depressed state).

In addition to controlling the strobe drive circuit (driver 37) so that it causes the strobe 4 to flash appropriately, the CPU 39 controls the red-eye reduction LED drive circuit (driver) 38 to cause the red-eye reduction LED 15 to emit light prior to firing the strobe 4.

When the LCD cover 14 is open, (i.e., when the electronic viewfinder is being used), the CPU 39 prevents the strobe 4 from flashing. Thus, it is possible to photograph the object in the same state as it is displayed in the electronic viewfinder.

The CPU 39 records data and time information in the image memory area 24A of the memory card 24 as header information according to timer 45. In other words, the photographic image data recorded in the image memory area 24A contains photographic date and time data.

After the digitized sound information is compressed, the sound data is temporarily stored in the buffer memory 36 by the CPU 39 and is recorded in a specified area (i.e., sound recording area) of the memory card 24. The recording date and time data may also be recorded as header information of the sound data in the sound recording area of the memory card 24.

The CPU 39 controls the lens drive circuit (driver) 30 to perform autofocus operations by moving the photographic lens 3, and controls the stop drive circuit 53 to change the aperture diameter of the stop 54 positioned between the photographic lens 3 and the CCD 20.

The CPU 39 may control the in-viewfinder display circuit 40 to display the settings of the various actions on the in-viewfinder display 26.

The CPU 39 performs data receipt from external equipment (not shown) via the interface (I/F) 48.

The CPU 39 receives signals from operating keys 7 and touch tablet 6A and processes them appropriately.

When a specified position of the touch tablet 6A is pressed by the pen (or pen-type pointing device) 41, the CPU 39 reads the X-Y coordinates of the pressed position and has that coordinate data (i.e., the memo information described later) stored in the buffer memory 36. A low-pass filter 61 may be provided between the CPU 39 and the touch tablet 6A to eliminate the high spatial frequency component of the memo information provided from the touch tablet 6A. The CPU 39 has the memo information stored in the buffer memory 36 recorded in the line drawing memory area 24B of the memory card 24 along with header information such as date and time of the memo information.

Various operations of the electronic camera 1 of a preferred embodiment will now be explained. First, operation of the electronic viewfinder of LCD 6 will be explained.

In a state in which the release switch 10 is half-depressed by the user, the DSP 33 determines whether the LCD cover 14 is open based on the signal value provided by the CPU 39 corresponding to the state of the LCD switch 25. When the LCD cover 14 is closed, operation of the electronic viewfinder is not performed. In such a case, the DSP 33 halts processing until the release switch 10 is operated.

Because operation of the electronic viewfinder is not performed when the LCD cover 14 is closed, the CPU 39 halts operations of the CCD 20, the image processor 31 and the stop drive circuit 53. Also, the CPU 39 activates the photometry circuit 51 and the colorimetry circuit 52 and provides those measurement results to the image processor 31. The image processor 31 uses the measurement results when controlling the white balance and brightness.

Also, when the release switch 10 is operated, the CPU 39 activates the CCD 20 and the stop drive circuit 53.

On the other hand, when the LCD cover 14 is open, the CCD 20 performs an electronic shutter action at the specified exposure time for each specified time and photoelectrically converts the optical (light) images of the objects collected by the photographic lens 3 to electric signals. The CCD 20 then outputs the image signals obtained through that operation to the image processor 31.

The image processor 31 performs white balance control and brightness control, applies specified processing to the image signals, and then outputs the image signals to the A/D conversion circuit 32. When the CCD 20 is operating, the image processor 31 uses an adjusted value used for white balance control and brightness control calculated by the CPU 39 using the output of the CCD 20.

The A/D conversion circuit 32 converts the image signals (analog signals) to image data (digital signals) and outputs the data to the DSP 33.

The DSP 33 outputs the digital image data to the frame memory 35 and has the images corresponding to the digital image data displayed to the LCD 6.

Thus, when the LCD cover 14 is open, operation of the electronic viewfinder is performed whereby the CCD 20 performs the shutter action in the specified time interval and converts the signals output from the CCD 20 to digital image data. The image data is output to the frame memory 35 and images of the objects are continuously displayed to the LCD 6.

When the LCD cover 14 is closed, operation of electronic viewfinder is not performed and power consumption is conserved by halting operations of the CCD 20, image processor 31, and stop drive circuit 53.

Photography of objects using the present apparatus will now be explained.

A mode in which the continuous mode switch 13 (on face Y2) is switched to the S mode (i.e., the mode in which only one frame is photographed) will now be explained. When power is supplied to the electronic camera 1 by switching the power switch 11 (FIG. 1) to "ON," and the release switch 10 (on face Y1) is pressed, photographic processing of the object is started.

When the LCD cover 14 is closed, the CPU 39 starts operations of the CCD 20, image processor 31 and stop drive circuit 53 when the release switch 10 is in the half-depressed state and starts photographic processing when the release switch reaches the fully depressed state.

The light image of the object observed through the viewfinder 2 is collected by the photographic lens 3 and is formed on the CCD 20, which has multiple pixels. The light image of the object formed on the CCD 20 is photoelectrically converted into image signals by each pixel and is sampled by the image processor 31. The image signals sampled by the image processor 31 are provided to the A/D conversion circuit 32, and they are digitized and output to the DSP 33.

After the image data has been temporarily output to the buffer memory 36, the DSP 33 reads the image data from the buffer memory 36, compresses it according to a JPEG (Joint Photographic Experts Group) method in which discrete cosine transformation, quantization, and Huffman encoding are applied, and has the compressed image data stored in the image memory area 24A of the memory card 24. At this time, the photographic date and time data are recorded in the image memory area 24A of the memory card 24 as header information of the photographic image data.

When the continuous mode switch 13 is in the S mode, only one frame of photography is performed. Even if the release switch 10 is continuously pressed, subsequent photography is not performed. When the release switch 10 is continuously depressed while the LCD cover 14 is open, the photographic image is displayed on the LCD 6.

A mode in which the continuous mode switch 13 is switched to the L mode (i.e., the mode in which continuous shooting of 8 frames per second is performed) will now be explained. When power is supplied to the electronic camera 1 by switching the power switch 11 to "ON," the release switch 10 provided on face Y2 is depressed and photographic processing of the object is started.

When the LCD cover 14 is closed, the CPU 39 starts operations of the CCD 20, the image processor 31 and the stop drive circuit 53 when the release switch 10 is in the half-depressed state, and starts photographic processing when the release switch reaches the fully depressed state.

The light image of the object observed through the viewfinder 2 is collected by the photographic lens 3 and is formed on the CCD 20. The light image of the object formed on the CCD 20 is photoelectrically converted into image signals by each pixel and is sampled by the image processor 31 at a rate of 8 times per second. At this time the image processor 31 thins out ¾ of the pixels in the CCD 20.

Figure 7:
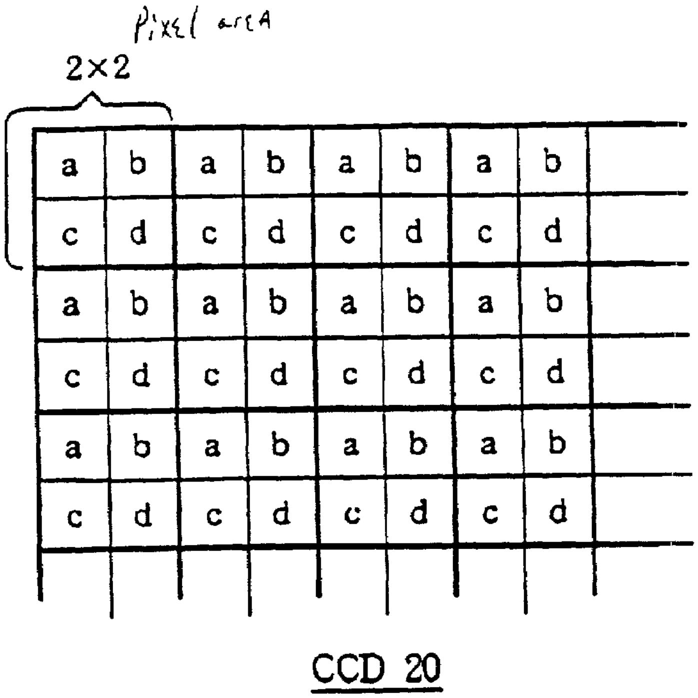
FIG. 7 is a drawing showing a first pixel thinning process.

In other words, the image processor 31 divides the pixels of the CCD 20, which are arranged in a matrix, into areas of 2×2 pixels (four pixels) as shown in FIG. 7 and samples the image signal of one pixel from a fixed position of each area while thinning out the remaining three pixels.

For example, during the first sampling (first frame), the top left pixel a of each area is sampled and the remaining pixels b, c, and d are thinned out. During the second sampling (second frame), the top right pixel b of each area is sampled and the remaining pixels a, c, and d are thinned out. Following that, during the third and fourth samplings, the bottom left pixel c and the bottom right pixel d are respectively sampled and the other pixels are thinned out. In short, each pixel is sampled every four frames.

The image signals sampled by the image processor 31 (i.e., the image signals of ¼ in the CCD 20) are provided to the A/D conversion circuit 32 and are digitized there before being output to the DSP 33.

After the image data has been temporarily output to the buffer memory 36, the DSP 33 reads the image data from the buffer memory 36, compresses it according to the JPEG method, and then has it stored in the image memory area 24A of the memory card 24. At this time, photographic date and time data are recorded in the image memory area 24A of the memory card 24 as header information of the photographic image data.

A mode in which the continuous mode switch 13 is switched to the H mode (i.e., the mode performing continuous shooting of 30 frames per second) will now be explained. When the power switch 11 is turned "ON" and the release switch 10 is depressed, photographic processing of the object is started.

When the LCD cover 14 is closed, the CPU 39 starts operations of the CCD 20, the image processor 31 and the stop drive circuit 53 when the release switch 10 is in the half-depressed state and starts photographic processing when the release switch reaches the fully depressed state.

The light image of the object observed through the viewfinder 2 is collected by the photographic lens 3 and is formed on the CCD 20. The light image of the object formed on the CCD 20 is photoelectrically converted into image signals by each pixel and is sampled by the image processor 31 at a rate of 30 times per second. At this time, the image processor 31 thins out 8/9 of the pixels of the image in the CCD 20.

Figure 8:
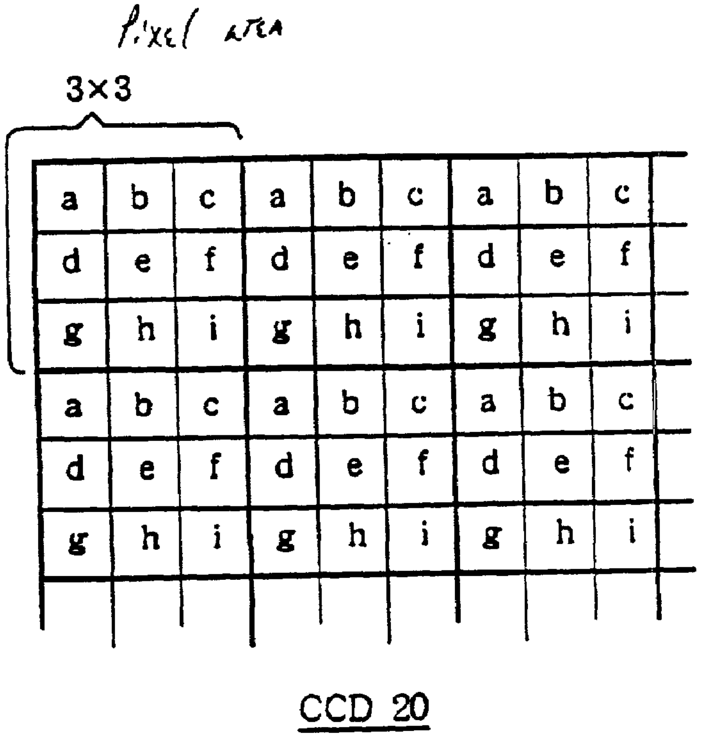
FIG. 8 is a drawing showing a second pixel thinning process.

In other words, the image processor 31 divides the pixels of the CCD 20 into areas of 3×3 pixels as shown in FIG. 8 and samples from each area the electrical image signal of one pixel placed in a fixed position at a rate of 30 times per second while thinning out the remaining eight pixels.

For example, during the first sampling (first frame), the top left pixel a of each area is sampled, and the other pixels b through i are thinned out. During the second sampling (second frame), the pixel b located to the right of pixel a is sampled, and the other pixels a and c through i are thinned out. Following that, during the third sampling and so on, the pixel c, pixel d, etc. . . . , are variously sampled, and the other pixels are thinned out. In short, each pixel is sampled every nine frames.

The image signals sampled by the image processor 31 (i.e., the image signals of 1/9 the pixels in the CCD 20) are provided to the A/D conversion circuit 32 and are digitized there before being output to the DSP 33.

After the image data has been temporarily output to the buffer memory 36, the DSP 33 reads out the image data from the buffer memory 36, compresses it according to the JPEG method, and then has it stored in the image memory area 24A of the memory card 24 with the photographic date and time header information.

Light can be projected on the objects by operating the flash component 4. However, when the LCD cover 14 is open (i.e., when the LCD 6 is performing the electronic viewfinder operation) then the CPU 39 can control the strobe 4 to not flash.

Operations when inputting two-dimensional information (i.e., pen input information) from the touch tablet 6A will now be explained.

When the touch tablet 6A is pressed by the pen tip of the pen 41, the X-Y coordinates of the touched locations are input into the CPU 39 and stored in the buffer memory 36. Also, data is written into the locations within the frame memory 35 corresponding to the X-Y coordinates. Memos may be displayed on LCD 6 corresponding to contact of the pen 41.

Because the touch tablet 6A is made of a transparent material, the user can observe the points displayed on the LCD 6 in positions where the pen tip of the pen 41 has pressed the touch tablet 6A. Thus, it appears as if the pen 41 input the images directly on the LCD 6. When the pen 41 is moved while contacting the touch tablet 6A, a line is displayed on the LCD 6 following movement of the pen 41. When intermittently moving the pen 41 on the touch tablet 6A, a broken line is displayed on the LCD 6 following movement of the pen 41. Thus, the user can input the desired memo information such as characters and figures using the touch tablet 6A.

When memo information such as characters are input using the pen 41 while images are displayed on the LCD 6, the memo information is synthesized (combined) in the frame memory 35 along with the image information and is displayed on the LCD 6 at the same time.

The user can select colors of the memos displayed on the LCD 6 from colors such as black, white, red, and blue by operating a palette.

When the execute (run) key 7B of the operating keys 7 is pressed after input of memo information to the touch tablet 6A using the pen 41, the memo information stored in the buffer memory 36 is provided to the memory card 24 along with the input date and time as header information. It is then recorded in the line drawing memory area 24B of the memory card 24.

The memo information recorded on the memory card 24 is information that has undergone compression processing. Because the input memo information includes a great deal of information having a high spatial frequency component, when performing compression processing by the JPEG method the compression efficiency is poor and the amount of information is not reduced. Furthermore, because compression by the JPEG method is lossey compression, it is not suitable for compression of line drawings having a small amount of information because gathering and smearing become prominent due to gaps of the information when decompressed and displayed on the LCD 6.

Thus, in a preferred embodiment, the memo information is compressed by the run-length method as used by facsimile machines. The run-length method is a method of compressing memo information by scanning the line-drawn screen in the horizontal direction and encoding each continuous length of the information of each color (black, white, red, blue and the like) and each continuous length of non-information (the parts having no pen input).

By using this run-length method, it is possible for the memo information to be efficiently compressed to suppress the gaps of information even after decompressing the compressed memo information. When the amount of information of the memo information is comparatively small, it also can be made so as not to compress it.

Also, when memo information is input by the pen 41 while displaying a photographic image on the LCD 6, then the photographic image data and the pen-input memo information are synthesized in the frame memory 35 and a composite image of the photographic image and the memo information is displayed on the LCD 6. Meanwhile, the photographic image data is recorded on the image memory area 24A of the memory card 24 while the memo information is recorded on the line drawing memory area 24B of the memory card 24. Because two different types of information are recorded in the different areas, the user can delete either of the images (e.g., memo information) from the composite image of the photographic image and the memo. In addition, each type of information can be compressed using an individual compression method.

Figure 9:
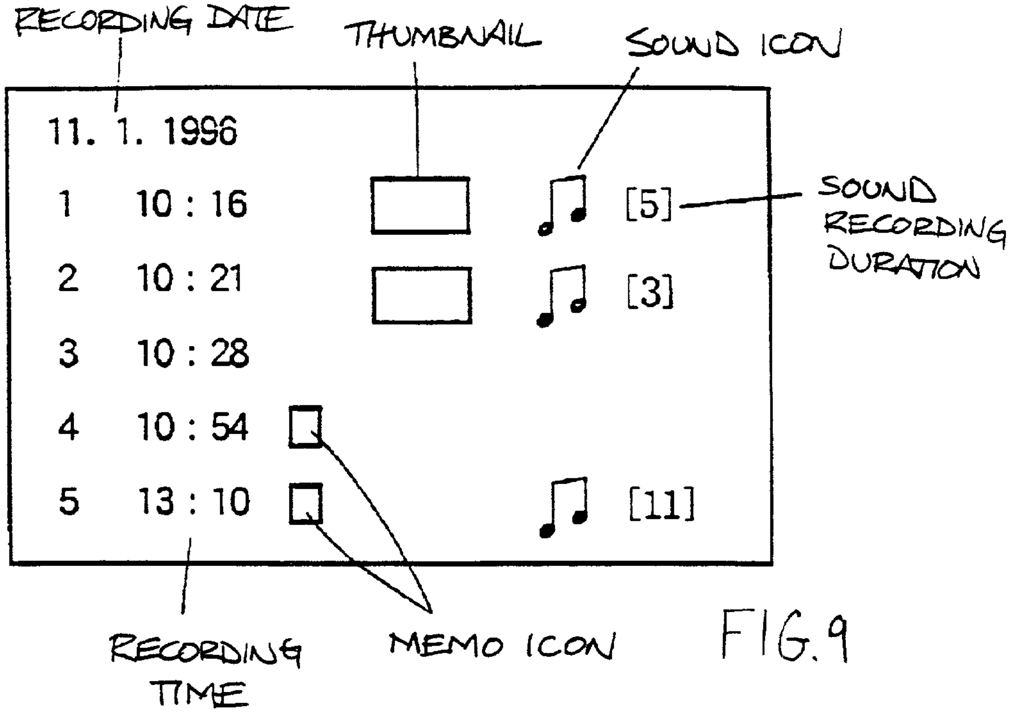
FIG. 9 is a drawing showing a display screen displayed on the LCD.

When data is recorded in the sound recording area (not shown), image memory area 24A or line drawing memory area 24B, a list of the recorded data can be displayed on the LCD 6 as shown in FIG. 9.

FIG. 9 displays the date when the information was recorded (in this case, Nov. 1, 1996) at the upper end of the LCD 6 display screen. The recording time is displayed on the leftmost side of the screen.

Thumbnail images are displayed on the right side of the recording time when image data is recorded. These thumbnail images are reduced images created by thinning out the bit-mapped data of each image data recorded on the memory card 24. In other words, the information recorded at "10:16" and "10:21" includes image information, and the information recorded at the other times do not include image data.

The memo icon "[□]" indicates that a memo is recorded as line-drawing information.

A sound icon (musical note) is displayed on the right side of the thumbnail image display area and a sound recording duration (number of seconds) is displayed on the sound icon's right. This is not displayed when sound information is not input.

The user selects the sound information to be reproduced by pressing the desired sound icon with the pen tip of the pen 41 and causes reproduction of the selected information by pressing the execute (run) key 7B shown in FIG. 2 with the pen tip of the pen 41.

For example, when the displayed sound icon at "10:16" shown in FIG. 9 is pressed by the pen 41, the CPU 39 reads the sound data from the memory card 24 corresponding to the selected sound recording time (10:16). The CPU 39 then expands (decompresses) that sound data and then provides it to the A/D and D/A conversion circuit 42. The A/D and D/A conversion circuit 42 converts the sound data to analog signals and then reproduces them via the speaker 5.

When reproducing image data, the user selects that information by pressing with the pen tip of the pen 41 on the desired thumbnail image, and then presses the execute (run) key 7B.

In other words, the CPU 39 instructs the DSP 33 to read the photographic image data from the memory card 24 corresponding to the recording date and time of the selected thumbnail. The DSP 33 expands the photographic image data (compressed photographic image data) read out from the memory card 24 and has the expanded data stored in the frame memory 35 as bit-mapped data and displayed on the LCD 6.

The images photographed in S mode are displayed as still images on the LCD 6. These still images are those having reproduced the image signals of all the pixels of the CCD 20.

The images photographed in L mode are displayed continuously (as moving pictures) at a rate of 8 frames per second on the LCD 6. At this time, the number of pixels displayed in each frame is ¼ the total number of pixels of the CCD 20.

Ordinarily, because the human eye reacts sensitively to the degradation of the resolution of still images, thinning out of the pixels of still images is observed as a degradation of image quality by the user. Nevertheless, when the continuous shooting speed during photography rises, 8 frames per second being photographed in L mode, and these images are reproduced at a speed of 8 frames per second, the number of pixels of each frame becomes ¼ the number of pixels of the CCD 20. However, because the human eye observes the images at 8 frames per second, the amount of information that enters the human eye in one second is twice that of a still image.

In other words, if the number of pixels of one frame of an image photographed in S mode is 1, then the number of pixels of one frame of an image photographed in L mode is ¼. The amount of information that enters the human eye in one second when the image photographed in S mode (still image) has been displayed to the LCD 6 becomes 1=((1 pixel)×(1 frame)). On the other hand, the amount of information that enters the human eye in one second when the images photographed in L mode are displayed to the LCD 6 becomes 2=((¼ pixels)×(8 frames)). In other words, twice as much information as the still image enters the human eye. Consequently, even though the number of pixels in one frame is ¼, the user can observe the reproduced images without noticing degradation of the image quality.

Furthermore, in at least one preferred embodiment, because each frame samples a different pixel, and those sampled pixels are displayed to the LCD 6, there is an after-image effect in the human eye. Even though ¾ of the pixels per frame have been thinned out, the user can observe the images photographed in L mode on the LCD 6 without noticing degradation of the image quality.

Also, images photographed in H mode are continuously displayed at a rate of 30 frames per second on the LCD 6. At this time, the number of pixels displayed in each frame is ⅑ the total number of pixels of the CCD 20. However, for the same reasons as in L mode, the user can observe the photographed images in H mode on the LCD 6 without noticing degradation of the image quality.

In at least one preferred embodiment, because the image processor 31 thins out the pixels of the CCD 20 to the extent that the degradation of the image quality during reproduction is not noticed when the objects are photographed in L mode and H mode, the load on the DSP 33 can be reduced and the DSP 33 can be operated at low speed and low power. Also, by doing this, it is possible to reduce the cost and power consumption of the apparatus.

It is possible to photograph light images of objects and to record memo (line-drawing) information. In at least one preferred embodiment, there are modes (photographing mode and memo input mode) that are appropriately selected according to operations of the user so that input of information can be performed smoothly.

An optical low-pass filter 60 is provided between the lens 3 and the CCD 20 to eliminate a designated spatial frequency component. The designated spatial frequency component is determined according to the size of the elements of the imaging elements constituting the CCD 20. Ordinarily, if the pixel pitch of the CCD corresponds to N pixels per 1 millimeter (mm), a spatial frequency component higher than N/2 per 1 mm cannot be input. In other words, the spatial frequency component (patterns finer than the pixel interval), contained in the object, which is higher than half the sampling frequency is commonly deleted. If this optical low-pass filter 60 does not exist, moire effects (bending illusions) and false color signals appear in the images and dirty images are recorded when those have been recorded having colors applied where they originally were not.

A ⅓-inch CCD having 640×480 pixels has been developed as a CCD for still imaging. Since the pixel pitch of this CCD is 7.4 microns, the cut-off frequency of the optical low-pass filter 60 is about 67 ((1/0.0074)/2) pixels per 1 mm.

A low-pass filter 61 may be provided between the touch tablet 6A and the CPU 39. When the touch tablet 6A is an analog-type (e.g., when performing input of line drawings by change in resistance when the touch tablet 6A is pressed), the signal levels input from the touch tablet 6A become almost continuously changing values. Nevertheless, when reproducing figures input by pen 41, the resolution should be sufficient so that the figures can be recognized; however, with a higher resolution, it runs up excess memory capacity. Since line drawings are input while confirming by the LCD 6, the resolution during input of the line drawings need not be higher than the resolution of the LCD 6. Conversely, jagged edges become prominent when making the resolution of the line drawings lower than the resolution of the LCD 6.

Thus, if the number of pixels of the LCD 6 is 280×220 pixels, the matrix representing the line drawings is 320×240, which is nearly identical to the number of pixels of the LCD 6.

Lines finer than that (320×240) and the high spatial frequency component that cannot be input are digitally deleted by the low-pass filter 61.

The horizontal-vertical ratio (aspect ratio) of the matrix of the screen is 4:3, which is identical to the aspect ratio of the CCD 20. However, because the aspect ratio of the CCD 20 and the aspect ratio of the LCD 6 are not identical, the aspect ratio of the LCD 6 and the aspect ratio of the matrix of the line drawing are not identical. Furthermore, when having selected matrix values to represent the line drawings, they become the values as discussed above.

The CPU 39 may perform processing of the low-pass filter 61 using software. In this case, the output of the touch tablet 6A is converted into digital signals and read in by the CPU 39 by thinning them out. Then, there is no longer any need to provide a low-pass filter 61 by hardware.

The output of the DSP 33 and the line-drawing information recorded in the line drawing memory area 24B of the memory card 24 are provided to the frame memory 35 having a number of pixels being 640×480 pixels. At the stage where the line-drawing information is input into the frame memory 35, the line drawing represented by a 320×240 pixel matrix is interpolated by the CPU 39 to become a line drawing represented by a 640×480 pixel matrix. The output of the frame memory 35 is input into a low-pass filter 62 along with being output from a video output terminal 63.

A low-pass filter 62 may be provided between the frame memory 35 and the LCD 6. In order to display the 640×480 pixel images imaged by the imaging elements and processed by the DSP 33, and the line drawings having a 640×480 pixel matrix interpolated by the CPU 39, on the LCD 6 with 280×220 pixels, the low-pass filter 62 eliminates their high spatial frequency components.

Figure 13:
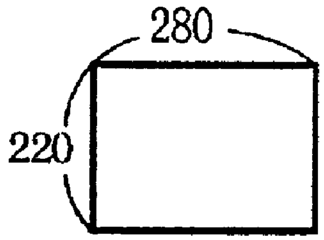
FIG. 13 shows the resolution of a memo image.
Figure 14:
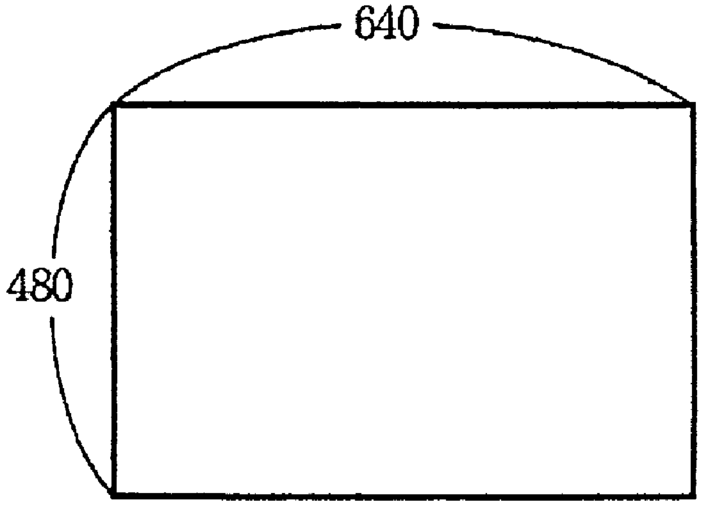
FIG. 14 shows the resolution of a photographic image.

Moreover, if the value of the matrix showing the line drawing (memo image) as shown in FIG. 13 is defined as the same as the pixel number of the LCD 6 (i.e., 280 horizontal pixels by 220 vertical pixels), there is no need to remove the high spatial frequency component(s) of the line drawing. That is, line drawing data having a pixel number of 280 pixels (horizontal)×220 pixels (vertical) is supplied to the frame memory 35 in its existing resolution. Meanwhile, image data having a pixel number of 640 pixels (horizontal)×480 pixels (vertical) that has been imaged by the imaging element and processed by the DSP 33, is converted by a thinning process to image data having a pixel number of 280 pixels (horizontal)×220 pixels (vertical), after which it is supplied to the frame memory 35.

Thus, the image data and line-drawing data having the high spatial frequency components removed are provided to the LCD 6 such that the corresponding image and line drawing are superimposed displayed.

The memory card 24 can be divided into an image memory area 24A for recording images photographed by the CCD 20 and a line drawing memory area 24B for recording line drawings input from the touch tablet 6A using the pen 41. For each one screen, the side of the photographed image memory area 24A is larger than the line drawing memory area 24B. This is because the amount of information possessed by the line drawings represented by a 320×240 pixel matrix, and the color information of each pixel being represented by 4 bits, is less than the amount of information possessed by the images input by the CCD 20, having 640×480 pixels, and the color information of each pixel being represented by 24 bits. Thus, it is possible to efficiently record information having different amounts of information.

Figure 10:
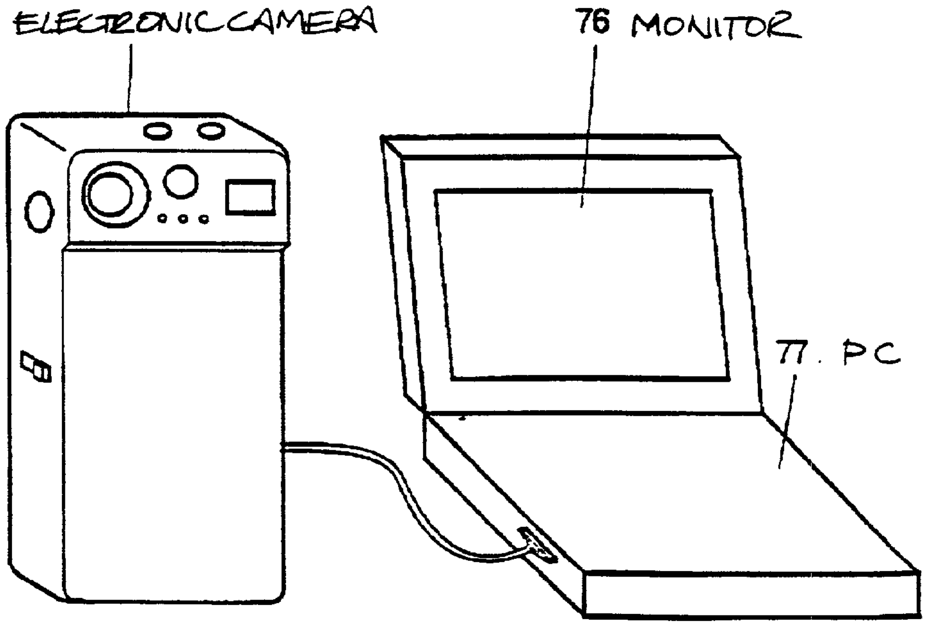
FIG. 10 is a drawing showing a PC connected to the electronic camera.

FIG. 10 shows the electronic camera 1 connected to a PC (personal computer) 77 with a monitor 76 having a number of pixels greater than the number of pixels of the LCD 6. If the number of pixels of the image display area of the monitor 76 is 640×480 pixels (identical to the CCD 20), then PC 77 having the electronic camera 1 can be configured as shown in FIG. 11.

Figure 11:
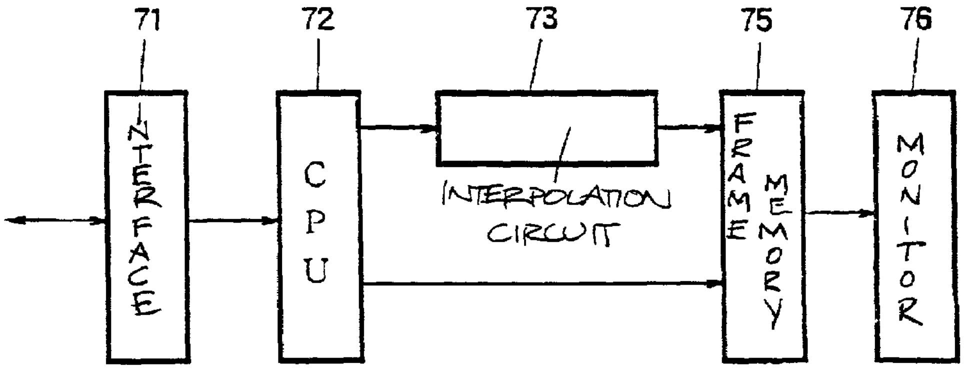
FIG. 11 is a block drawing showing a PC connected to the electronic camera.

In FIG. 11, an interface 71 is connected to the interface 48 of the electronic camera 1, and the image information and line-drawing information from the electronic camera 1 is input. The interface 71 is connected to the CPU 72 and the image line-drawing information input from the electronic camera 1 is provided to the CPU 72. In addition to controlling input of the image and line-drawing information from the electronic camera 1, the CPU 72 provides the line-drawing information to the interpolation circuit 73 and provides the image information to the frame memory 75.

The interpolation circuit 73 applies interpolation processing to the line-drawing information and matches the number of pixels of the line-drawing information to the number of pixels of the monitor 76 and then provides it to the frame memory 75. The line-drawing and image information from the frame memory 75 are provided to the monitor 76 where they are displayed superimposed.

That is, because the line-drawing information recorded in the line drawing memory area 24B of the electronic camera 1 has only 320×240 pixels, it may be interpolated by the interpolation circuit 73 into 640×480 pixel line-drawing information and provided to the frame memory 75. Meanwhile, since the image information recorded in the image memory area 24A has a number of pixels identical to the number of pixels of the CCD 20 and the number of pixels of the display area of the monitor 76, it may be provided directly to the frame memory 75 via the interfaces 48 and 71 and the CPU 72. Thus, the line drawing corresponding to the interpolated line-drawing information mentioned above and the image corresponding to the image information are displayed superimposed on the monitor.

Figure 12:
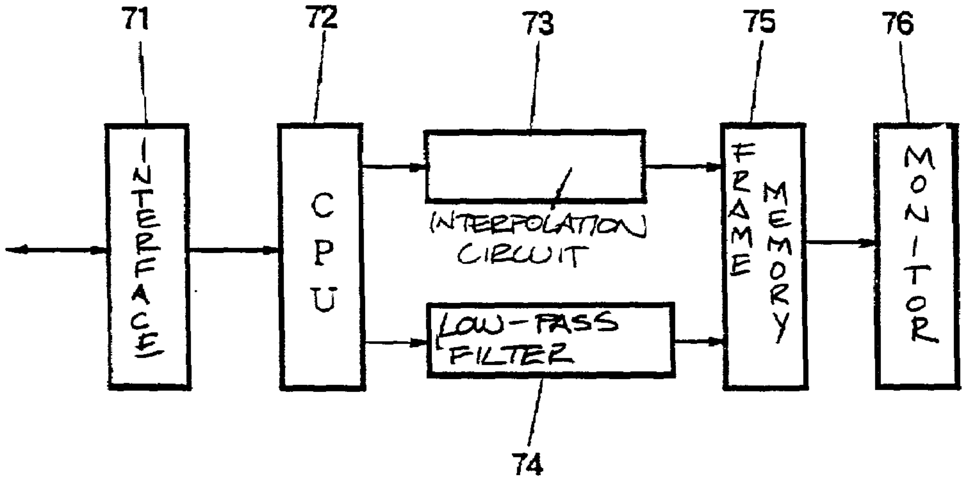
FIG. 12 is a block drawing showing another configuration of a PC connected to the electronic camera.

If the number of pixels of the image display area of the monitor 76 is less than the number of pixels of the CCD 20 (e.g., 400×300 pixels), then the PC 77 connected to the electronic camera shown in FIG. 12 can be configured with an interpolation circuit 73 for interpolating the line-drawing information and a low-pass filter 74 for thinning out the image information.

In FIG. 12, the interface 71 is for the interface 48 of the electronic camera 1 to be connected in the same manner as in FIG. 11, and the interface 71 is connected to the CPU 72. Because the line-drawing information recorded in the line drawing memory area 24B has only 320×240 pixels, it is interpolated by the interpolation circuit 73 and becomes line-drawing information with 400×300 pixels, which is provided to the frame memory 75.

Meanwhile, because the number of pixels of the CCD 20 is more than the number of pixels of the display area of the monitor 76, the image information recorded in the image memory area 24A is provided to the low-pass filter 74 via the interfaces 48 and 71 and the CPU 72. There, the image information is thinned out and is converted into image information having 400×300 pixels. After that, it is provided to the frame memory 75 and the line drawing corresponding to the interpolated line-drawing information mentioned above and the image corresponding to the image information are displayed superimposed on the monitor 76.

By eliminating the useless information contained in the input image information and line-drawing information using a low-pass filter based on the amount of image information input by the CCD 20 and the amount of line-drawing information input using the touch tablet 6A and the pen 41, it is possible to reduce the recording areas necessary for recording the information such that scale reduction, cost reduction and reduction of power consumption of the apparatus become possible.

A PC 77 may be connected to the electronic camera 1 so that the images and line drawings are displayed to the monitor 76 of the PC 77. However it is possible to have them displayed to a television or other display device.

Further, it is possible to make the pixel numbers (resolution) the same to display the superimposed images on the same display by performing an interpolation process using an interpolation circuit 73, the CPU 39 or the like, or a thinning process by low pass filters 62, 74 and the like to the readout of the recorded image information and line drawing information corresponding to the respective information amounts (resolution).

Further, it is possible for the program that performs each process on the CPU 39 to be stored on a ROM 43, memory card 24, or the like of the electronic camera 1. This program may be supplied to the user as previously stored in the ROM 43 or memory card 24. It is further acceptable if it is able to be copied on the ROM 43 or memory card 24 or supplied to the user as stored on a CD-ROM (compact disk-read only memory) or the like. In this case, the ROM 43 may be an electrically rewriteable EEPROM (electrically erasable and programmable read only memory) or the like. The program also can be provided via a communications network, such as the Internet (World Wide Web).

The specific number of pixels used in the above embodiments are examples and the present invention is not limited to those examples.

The information processing apparatus may include a first output device that outputs the first image at a first resolution and a second output device that outputs the second image at a second resolution different from the first resolution. It is therefore possible to use memory areas corresponding to each resolution and to conserve memory.

A first memory device may record the first image having the high spatial frequency component eliminated by a first filter device. A second memory device may record the second image having the high spatial frequency component eliminated by a second filter device. An interpolation device may interpolate the second image recorded by the second memory device. The third filter device eliminates the high spatial frequency components of the first image output by the first memory device and the second image interpolated by the interpolation device. The output device outputs a third image having superimposed the first image with the high spatial frequency component eliminated by the third filter device and the second image having the high spatial frequency component eliminated by the third filter device. Therefore, it is possible to efficiently record images of different resolutions and to display them on the same display device.

A first memory device may record the first image having the high spatial frequency component eliminated by the first filter device. A second memory device may record the second image having the high spatial frequency component eliminated by the second filter device. An interpolation device may interpolate the second image recorded by the second memory device. An output device may output a third image having superimposed the first image output by the first memory device and the second image interpolated by the interpolation device. Therefore, a low-resolution second image may be output by interpolating it to the same resolution as the first image. It is therefore possible to efficiently record images of different resolutions and have them displayed on the same display device.

A first memory device may record the first image having the high spatial frequency component eliminated by a first filter device. A second memory device may record the second image having the high spatial frequency component eliminated by the second filter device. An interpolation device may interpolate the second image recorded by the second memory device. A pixel thinning device may perform pixel thinning on the first image recorded by the first memory device. An output device may output a third image having superimposed the first image having undergone pixel thinning processing by the pixel thinning device and the interpolated second image recorded by the second memory device. Therefore, it is possible to output a first image having a resolution higher than the resolution of the display screen by thinning the pixels and a second image having a resolution lower than the display screen by interpolating it.

It is therefore possible to efficiently record images of different resolutions and have them displayed on the same display device.

A program may be recorded on a recording medium to control the apparatus so that a first image is output in a first resolution, and a second image is output in a second resolution that differs from the first resolution. As a result, it is possible to use storage areas correlated to the respective resolutions, and to save memory.

Although the JPEG and run length encoding compression techniques are described, other compression techniques (or no compression at all) can be used with the invention.

Although a touch tablet with input pen is described as structures through which selections and commands can be input, the invention is not limited to such structure. For example, the touch tablet can be actuable by the user's finger.

The invention is not limited to implementation by a programmed general purpose computer as shown in the preferred embodiment. For example, the invention can be implemented using one or more special purpose integrated circuit(s) (e.g., ASIC). It will be appreciated by those skilled in the art that the invention can also be implemented using one or more dedicated or programmable integrated or other electronic circuits or devices (e.g., hardwired electronic or logic circuits such as discrete element circuits, or programmable logic devices such as PLDs, PLAs, PALs or the like).

While the invention has been described in relation to preferred embodiments, many modifications and variations are apparent from the description of the invention. All such modifications and variations are intended to be within the scope of the present invention as defined in the appended claims.

What is claimed is:

1. A portable camera, comprising:

first image input means for inputting a first image in a portable camera, the first image being a photographic image;

first filter means for eliminating a high spatial frequency component of said first image;

first memory means for recording said first image having said high spatial frequency component eliminated by said first filter means;

second image input means for inputting a second image in the portable camera, the second image being a line drawing;

second filter means for eliminating the high spatial frequency component of said second image;

second memory means for recording said second image having said high spatial frequency component eliminated by said second filter means;

interpolation means for interpolating said second image recorded by said second memory means; and output means for outputting a third image in which said first image recorded by said first memory means and said second image interpolated by said interpolation means are superimposed.

2. The portable camera of claim 1, further comprising display means for displaying said third image output by said output means.

3. The portable camera of claim 1, wherein said second image input means includes a touch tablet and pen means for inputting said line drawing to said touch tablet.

4. The portable camera of claim 1, wherein a capacity of said first memory means is greater than a capacity of said second memory means.

5. A portable camera, comprising:

first image input means for inputting a first image in a portable camera, the first image being a photographic image;

first filter means for eliminating a high spatial frequency component of said first image;

first memory means for recording said first image having said high spatial frequency component eliminated by said first filter means;

second image input means for inputting a second image in the portable camera, the second image being a line drawing;

second filter means for eliminating a high spatial frequency component of said second image;

second memory means for recording said second image having said high spatial frequency component eliminated by said second filter means;

interpolation means for interpolating said second image recorded in said second memory means;

third filter means for eliminating the high spatial frequency component of said first image output by said first memory means and said second image interpolated by said interpolation means; and output means for outputting a third image in which said first image having said high spatial frequency component eliminated by said third filter means and said second image having said high spatial frequency component eliminated by said third filter means are superimposed.

6. The portable camera of claim 5, further comprising display means for displaying said third image output by said output means.

7. The portable camera of claim 5, wherein said second image input means includes a touch tablet and pen means for inputting said line drawing to said touch tablet.

8. The portable camera of claim 5, wherein a capacity of said first memory means is greater than a capacity of said second memory means.

9. A portable camera, comprising:

first image input means for inputting a first image in a portable camera, the first image being a photographic image;

first filter means for eliminating a high spatial frequency component of said first image;

first memory means for recording said first image having said high spatial frequency component eliminated by said first filter means;

second image input means for inputting a second image in the portable camera, the second image being a line drawing;

second filter means for eliminating a high spatial frequency component of said second image;

second memory means for recording said second image having said high spatial frequency component eliminated by said second filter means;

interpolation means for interpolating said second image recorded by said second memory means;

pixel thinning means for performing pixel thinning on said first image recorded by said first memory means; and output means for outputting a third image in which said first image having undergone processing by said pixel thinning means and said interpolated second image recorded in said second memory means are superimposed.

10. The portable camera of claim 9, further comprising display means for displaying said third image output by said output means.

11. The portable camera of claim 9, wherein a capacity of said first memory means is greater than a capacity of said second memory means.

12. A portable camera, comprising:

a first image input device that inputs a first image in a portable camera, the first image being a photographic image;

a first filter coupled to the first image input device to eliminate a high spatial frequency component of said first image;

a first memory area coupled to the first filter to record said first image having said high spatial frequency component eliminated by said first filter;

a second image input device that inputs a second image in the portable camera, the second image being a line drawing;

a second filter coupled to the second image input device to eliminate a high spatial frequency component of said second image;

a second memory area coupled to the second filter to record said second image having said high spatial frequency component eliminated by said second filter;

an interpolation circuit coupled to the second memory area to interpolate said second image recorded in said second memory area;

a third filter coupled to the first memory area and to the interpolation circuit to eliminate the high spatial frequency component of said first image output by said first memory area and said second image interpolated by said interpolation circuit; and an output device coupled to the third filter to output a third image in which said first image having said high spatial frequency component eliminated by said third filter and said second image having said high spatial frequency component eliminated by said third filter are superimposed.

13. A portable camera, comprising:

a first image input device that inputs a first image in a portable camera, the first image being a photographic image;

a first filter coupled to the first image input device to eliminate a high spatial frequency component of said first image;

a first memory area coupled to the first filter to recording said first image having said high spatial frequency component eliminated by said first filter;

a second image input device that inputs a second image in the portable camera, the second image being a line drawing;

a second filter coupled to the second image input device to eliminate the high spatial frequency component of said second image;

a second memory area coupled to the second filter to record said second image having said high spatial frequency component eliminated by said second filter;

an interpolation coupled to the second memory area to interpolate said second image recorded by said second memory area; and an output device coupled to the first memory area and to the interpolation circuit to output a third image in which said first image recorded by said first memory area and said second image interpolated by said interpolation circuit are superimposed.

14. A portable camera, comprising:

a first image input device that inputs a first image in a portable camera, the first image being a photographic image;

a first filter coupled to the first image input device to eliminate a high spatial frequency component of said first image;

a first memory area coupled to the first filter to record said first image having said high spatial frequency component eliminated by said first filter;

a second image input device that inputs a second image in the portable camera, the second image being a line drawing;

a second filter coupled to the second image input device to eliminate a high spatial frequency component of said second image;

a second memory area coupled to the second filter to record said second image having said high spatial frequency component eliminated by said second filter;

an interpolation circuit coupled to the second memory area to interpolate said second image recorded by said second memory area;

a pixel thinning device coupled to the first memory area to perform pixel thinning on said first image recorded by said first memory area; and an output device coupled to the pixel thinning device and to the interpolation circuit to output a third image in which said first image having undergone processing by said pixel thinning device and said interpolated second image recorded in said second memory area are superimposed.

15. A method of controlling a portable camera, the method comprising the steps of:

inputting a first image in a portable camera, the first image being a photographic image;

eliminating a high spatial frequency component of said first image;

recording said first image having said high spatial frequency component eliminated therefrom;

inputting a second image in the portable camera, the second image being a line drawing;

eliminating a high spatial frequency component of said second image;

recording said second image having said high spatial frequency component eliminated therefrom;

interpolating said recorded second image;

eliminating the high spatial frequency component of said recorded first image and of said interpolated second image; and outputting a third image in which said first image having said high spatial frequency component eliminated therefrom and said second image having said high spatial frequency component eliminated therefrom are superimposed.

16. A method of controlling a portable camera, the method comprising the steps of:

inputting a first image in a portable camera, the first image being a photographic image;

eliminating a high spatial frequency component of said first image;

recording said first image having said high spatial frequency component eliminated therefrom;

inputting a second image in the portable camera, the second image being a line drawing;

eliminating the high spatial frequency component of said second image;

recording said second image having said high spatial frequency component eliminated therefrom;

interpolating said recorded second image; and outputting a third image in which said recorded first image and said interpolated second image are superimposed.

17. A method of controlling a portable camera, the method comprising the steps of:

inputting a first image in a portable camera, the first image being a photographic image;

eliminating a high spatial frequency component of said first image;

recording said first image having said high spatial frequency component eliminated therefrom;

inputting a second image in the portable camera, the second image being a line drawing;

eliminating a high spatial frequency component of said second image;

recording said second image having said high spatial frequency component eliminated therefrom;

interpolating said recorded second image;

performing pixel thinning on said recorded first image; and outputting a third image in which said pixel-thinned first image and said interpolated second image are superimposed.

* * * * *